United States Patent
Sekine et al.

(10) Patent No.: US 10,675,915 B2
(45) Date of Patent: Jun. 9, 2020

(54) RUBBER COMPOSITION AND PNEUMATIC TIRE MANUFACTURED USING SAME

(71) Applicant: The Yokohama Rubber Co., LTD., Minato-ku, Tokyo (JP)

(72) Inventors: Yuko Sekine, Hiratsuka (JP); Makoto Ashiura, Hiratsuka (JP); Ryosuke Sakai, Hiratsuka (JP); Fumito Yatsuyanagi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 90 days.

(21) Appl. No.: 15/558,177

(22) PCT Filed: Mar. 8, 2016

(86) PCT No.: PCT/JP2016/057225
§ 371 (c)(1),
(2) Date: Sep. 13, 2017

(87) PCT Pub. No.: WO2016/147962
PCT Pub. Date: Sep. 22, 2016

(65) Prior Publication Data
US 2018/0072100 A1      Mar. 15, 2018

(30) Foreign Application Priority Data

Mar. 13, 2015  (JP) ................ 2015-050327
Jun. 12, 2015  (JP) ................ 2015-119742

(51) Int. Cl.
| | |
|---|---|
| B60C 1/00 | (2006.01) |
| C08L 9/06 | (2006.01) |
| C08K 3/04 | (2006.01) |
| C08K 3/36 | (2006.01) |

(52) U.S. Cl.
CPC .............. B60C 1/0016 (2013.01); B60C 1/00 (2013.01); C08K 3/04 (2013.01); C08K 3/36 (2013.01); C08L 9/06 (2013.01); B60C 2001/0083 (2013.01); C08L 2205/025 (2013.01); C08L 2205/03 (2013.01)

(58) Field of Classification Search
CPC ..................................... B60C 1/00; C08L 9/06
USPC ....................................................... 523/156
See application file for complete search history.

(56) References Cited

U.S. PATENT DOCUMENTS

| | | | | |
|---|---|---|---|---|
| 4,387,575 A | * | 6/1983 | Wenzel | ............... F02C 1/04 60/648 |
| 6,472,464 B1 | | 10/2002 | Morita et al. | |
| 6,602,942 B1 | | 8/2003 | Karato | |
| 2011/0301280 A1 | | 12/2011 | Kushida | |

FOREIGN PATENT DOCUMENTS

| | | |
|---|---|---|
| JP | S57-179212 | 11/1985 |
| JP | H02-160846 | * 6/1990 |
| JP | H03-239737 | 10/1991 |
| JP | H09-020839 | 1/1997 |
| JP | H09-316132 | 12/1997 |
| JP | 2000-038423 | * 2/2000 |
| JP | 2000-281835 | 10/2000 |
| JP | 2011-252124 | 12/2011 |
| WO | WO 1996/30419 | 10/1996 |
| WO | WO 2000/58397 | 10/2000 |
| WO | WO 2013/118801 | 8/2013 |

OTHER PUBLICATIONS

International Search Report for International Application No. PCT/JP2016/057225 dated Jun. 7, 2016, 4 pages, Japan.

* cited by examiner

*Primary Examiner* — Deve V Hall
(74) *Attorney, Agent, or Firm* — Thorpe North & Western

(57) ABSTRACT

A rubber composition contains a diene rubber containing a styrene-butadiene copolymer component formed from at least one type of styrene-butadiene copolymer and a reinforcing filler; the styrene-butadiene copolymer satisfying: a bonded styrene content being from 5 to 50 wt. %; a total of styrene content of an ozone-decomposed component S1 having one styrene-derived unit and styrene content of an ozone-decomposed component S1V1 having one styrene-derived unit and one 1,2-bonded butadiene-derived unit being less than 80 wt. % of the bonded styrene content and a total of styrene content of the ozone-decomposed component S1V1 being 10 wt. % or greater of the bonded styrene content; an integrated intensity of an ozone-decomposed component S1V2 having one styrene-derived unit and two 1,2-bonded butadiene-derived units being 15% or greater of an integrated intensity of all ozone-decomposed components containing a styrene-derived unit; and a vinyl content of butadiene moiety being 50% or greater.

5 Claims, 1 Drawing Sheet

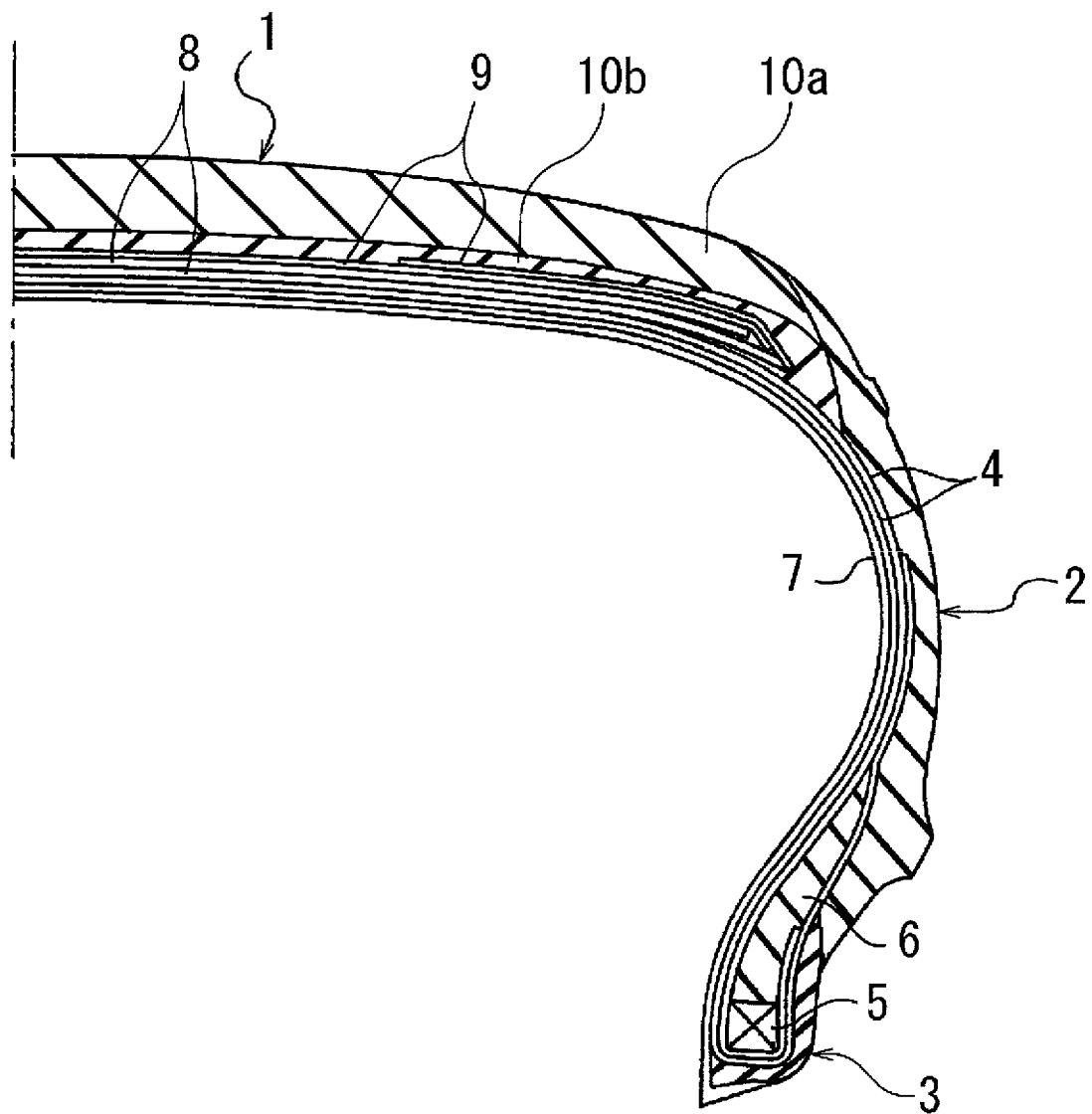

RUBBER COMPOSITION AND PNEUMATIC TIRE MANUFACTURED USING SAME

TECHNICAL FIELD

The present technology relates to a rubber composition with which low heat build-up is enhanced to or beyond conventional levels while wear resistance is ensured, and a pneumatic tire manufactured using the same.

BACKGROUND ART

In recent years, high wet grip performance and low rolling resistance have been demanded for pneumatic tires. To satisfy these, technologies in which a styrene-butadiene copolymer and a reinforcing filler such as silica are blended in a rubber composition constituting a cap tread of a tire have been known. Furthermore, to enhance wear resistance, rubber hardness, and modulus of repulsion elasticity of a rubber composition, for example, blending of polybutadiene and/or highly reactive silica has been proposed; however, in this case, problems of reduction in rubber strength, deterioration of processability, and the like existed.

Japanese Unexamined Patent Application Publication No. 03-239737A describes that a pneumatic tire manufactured using a rubber composition containing a styrene-butadiene copolymer having a particular arrangement of styrene-derived units, and silica in a tread can satisfy wet skid resistance, rolling resistance, and wear resistance at the same time. However, this rubber composition cannot always enhance wear resistance and low heat build-up and thus could not fully satisfy the demands from consumers.

Japanese Unexamined Patent Application Publication No. 57-179212 describes a styrene-butadiene copolymer in which, relative to a total styrene content in a styrene-butadiene copolymer, a long chain styrene block is 5 wt. % or less and one single chain is 50 wt. % or greater in styrene-derived units, and a total content of styrene is 10 to 30 wt. % of the styrene-butadiene copolymer. However, this is not sufficient to enhance rubber strength, wear resistance, and low hysteresis loss of rubber compositions.

SUMMARY

The present technology provides a rubber composition with which low heat build-up is enhanced to or beyond conventional levels while wear resistance is ensured.

The rubber composition of the present technology includes: a diene rubber containing at least one type of styrene-butadiene copolymer and a reinforcing filler; a styrene-butadiene copolymer component formed from the at least one type of styrene-butadiene copolymer having characteristics (1) to (4) below:

(1) a bonded styrene content being from 5 to 50 wt. %;

(2) when a decomposed component S1 having one styrene-derived unit and a decomposed component S1V1 having one styrene-derived unit and one 1,2-bonded butadiene-derived unit are measured by subjecting a decomposed component obtained by ozone decomposition to gel permeation chromatography (GPC), a total of styrene contents of the decomposed component S1 and the decomposed component S1V1 being less than 80 wt. % of the bonded styrene content, and a total of a styrene content of the decomposed component S1V1 being 10 wt. % or greater of the bonded styrene content;

(3) when the decomposed component obtained by ozone decomposition is measured by liquid chromatography-mass spectrometer (LCMS), an integrated intensity of a decomposed component S1V2 having one styrene-derived unit and two 1,2-bonded butadiene-derived units being 15% or greater of an integrated intensity of all the decomposed components containing a styrene-derived unit; and (4) a vinyl content of butadiene moiety being 50% or greater.

Since the rubber composition of the present technology contains a diene rubber containing a styrene-butadiene copolymer component and a reinforcing filler; the styrene-butadiene copolymer component satisfying that, as described above: (1) a bonded styrene content being from 5 to 50 wt. %; (2) a total of styrene content of an ozone-decomposed component S1 having one styrene-derived unit and styrene content of an ozone-decomposed component S1V1 having one styrene-derived unit and one 1,2-bonded butadiene-derived unit being less than 80 wt. % of the bonded styrene content and a total of styrene content of the ozone-decomposed component S1V1 being 10 wt. % or greater of the bonded styrene content; (3) an integrated intensity of an ozone-decomposed component S1V2 having one styrene-derived unit and two 1,2-bonded butadiene-derived units being 15% or greater of an integrated intensity of all ozone-decomposed products containing a styrene-derived unit; and (4) a vinyl content of butadiene moiety being 50% or greater, low heat build-up can be enhanced to or beyond conventional levels while wear resistance is ensured. Furthermore, modulus of repulsion elasticity can be maintained or enhanced.

The diene rubber preferably further contains at least one type selected from the group consisting of natural rubber, polyisoprene, and polybutadiene. Furthermore, the reinforcing filler is preferably at least one type selected from the group consisting of a silica and a carbon black.

The rubber composition described above is preferably used in a pneumatic tire and, particularly preferably used in a cap tread. The pneumatic tire can enhance rubber strength and wear resistance to or beyond conventional levels.

BRIEF DESCRIPTION OF DRAWINGS

FIG. 1 is a partial cross-sectional view in a tire meridian direction that illustrates an example of an embodiment of a pneumatic tire in which a rubber composition of the present technology is used.

DETAILED DESCRIPTION

FIG. 1 is a cross-sectional view that illustrates an example of an embodiment of a pneumatic tire in which a rubber composition is used. The pneumatic tire is formed from a tread portion 1, a sidewall portion 2, and a bead portion 3.

In FIG. 1, two layers of a carcass layer 4, formed by arranging reinforcing cords, which extend in a tire radial direction, in a tire circumferential direction at a predetermined pitch and embedding the reinforcing cords in a rubber layer, are disposed extending between the left and right side bead portions 3. Both ends of the carcass layer 4 are made to sandwich a bead filler 6 around a bead core 5 that is embedded in the bead portions 3 and are folded back in a tire axial direction from the inside to the outside. An innerliner layer 7 is disposed inward of the carcass layer 4. Two belt layers 8, formed by arranging reinforcing cords, which extend inclined in the tire circumferential direction, in the tire axial direction at a predetermined pitch and embedding these reinforcing cords in a rubber layer, are disposed on an outer circumferential side of the carcass layer 4 of the tread portion 1. The reinforcing cords of the two belt layers 8 are inclined with respect to the tire circumferential direction and the direction of the reinforcing cords of the different layers intersect with each other. A belt cover layer 9 is disposed on the outer circumferential side of the belt layers 8. The tread portion 1 is formed from tread rubber layers 10a and 10b on the outer circumferential side of the belt cover layer 9. The tread rubber layers 10a and 10b are cap tread and base tread, and preferably can be formed from the rubber composition of the present technology.

The rubber composition of the present technology contains a diene rubber and a reinforcing filler. The diene rubber contains at least one type of styrene-butadiene copolymer without exception. In the present specification, a polymer component formed from at least one type of styrene-butadiene copolymer is referred to as a "styrene-butadiene copolymer component". In the present technology, the styrene-butadiene copolymer component satisfies characteristics (1) to (4) described below. Note that, in the present specification, a moiety where a styrene unit in the main chain of the styrene-butadiene copolymer is ozone-decomposed is referred to as "styrene-derived unit", and a moiety where a butadiene unit that has been polymerized by 1,2-bonding in the main chain is ozone-decomposed is referred to as "1,2-bonded butadiene-derived unit".

(1) A bonded styrene content is from 5 to 50 wt. %.

(2) When a decomposed component S1 having one styrene-derived unit and a decomposed component S1V1 having one styrene-derived unit and one 1,2-bonded butadiene-derived unit are measured by subjecting a decomposed component obtained by ozone decomposition to gel permeation chromatography (GPC), a total of styrene contents of the decomposed component S1 and the decomposed component S1V1 is less than 80 wt. % of the bonded styrene content, and a total of a styrene content of the decomposed component S1V1 is 10 wt. % or greater of the bonded styrene content.

(3) When the decomposed component obtained by ozone decomposition is measured by liquid chromatography-mass spectrometer (LCMS), an integrated intensity of a decomposed component S1V2 having one styrene-derived unit and two 1,2-bonded butadiene-derived units is 15% or greater of an integrated intensity of all the decomposed components containing a styrene-derived unit.

(4) A vinyl content of butadiene moiety is 50% or greater.

When the styrene-butadiene copolymer component is formed from a styrene-butadiene copolymer alone, the styrene-butadiene copolymer alone needs to satisfy all of the characteristics (1) to (4) described above.

Furthermore, when the styrene-butadiene copolymer component is formed from a blend of a plurality of styrene-butadiene copolymers, the styrene-butadiene copolymer component as a whole needs to satisfy all of the characteristics (1) to (4) described above. As long as the styrene-butadiene copolymer component as a whole satisfies all of the characteristics (1) to (4), each of the styrene-butadiene copolymers constituting the blend may satisfy, or not satisfy, all of the characteristics (1) to (4) described above. Preferably, each of the styrene-butadiene copolymer constituting the blend satisfies all of the characteristics (1) to (4). By allowing the styrene-butadiene copolymer component to be composed of two or more type of styrene-butadiene copolymers satisfying all the characteristics (1) to (4), even better wear resistance and low heat build-up of the rubber composition are achieved. Furthermore, modulus of repulsion elasticity can be enhanced to or beyond conventional levels.

In the present technology, the styrene-butadiene copolymer component has (1) a bonded styrene content of 5 to 50 wt. %, and preferably 10 to 40 wt. %. By setting the styrene content of the styrene-butadiene copolymer component to be within such a range, excellent balance of wet skid characteristics and wear resistance and rubber strength of the rubber composition can be achieved. When the styrene content of the styrene-butadiene copolymer component is less than 5 wt. %, the wet skid characteristics, and wear resistance and rubber strength are deteriorated. When the styrene content of the styrene-butadiene copolymer component is greater than 50 wt. %, the glass transition temperature (Tg) of the styrene-butadiene copolymer component increases, thereby deteriorating the balance of viscoelastic characteristics and making it difficult to achieve the effect of reducing heat build-up. That is, the balance of hysteresis loss and wet skid characteristics is deteriorated. Note that the styrene content of the styrene-butadiene copolymer component is measured by $^1$H-NMR.

In the styrene-butadiene copolymer component used in the present technology, (2) an ozone-decomposed component S1 having one styrene-derived unit and an ozone-decomposed component S1V1 having one styrene-derived unit and one 1,2-bonded butadiene-derived unit are measured by subjecting a decomposed component obtained by ozone decomposition to gel permeation chromatography (GPC). At this time, a total of styrene contents of the ozone-decomposed component S1 and the ozone-decomposed component S1V1 is less than 80 wt. % of the bonded styrene content, and a total of a styrene content of the ozone-decomposed component S1V1 is 10 wt. % or greater of the bonded styrene content.

The styrene-butadiene copolymer is a copolymer of styrene and butadiene, and is formed from styrene repeating units (styrene units) and butadiene repeating units (butadiene units). The butadiene unit is formed from a moiety where butadiene is polymerized at the 1,2-bond (ethylene repeating unit having a vinyl group as a side chain thereof) and a moiety where butadiene is polymerized at the 1,4-bond (divalent group repeating unit of 2-butylene). Furthermore, a moiety that was polymerized at the 1,4-bond is formed from repeating units of trans-2-butylene structure and repeating units of cis-2-butylene structure.

When a styrene-butadiene copolymer is subjected to ozone decomposition, the moiety polymerized at the 1,4-bond is cleaved. Furthermore, the vinyl group of the side chain is oxidized to be a hydroxymethyl group. As a result, in the styrene-butadiene copolymer, as an ozone-decomposed component, a repeating unit which is sandwiched by adjacent two butadiene units polymerized at the 1,4-bonds is produced. For example, when a moiety in which only one styrene unit in the main chain is sandwiched by two butadiene units polymerized at the 1,4-bonds is subjected to ozone decomposition, a compound represented by the general formula (I) below is produced. In the present specification, the compound represented by the general formula (I) is referred to as "ozone-decomposed component S1".

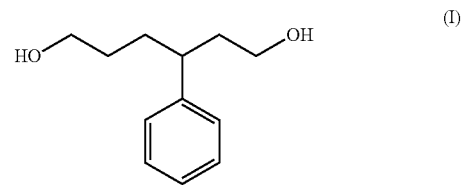

(I)

Furthermore, when a moiety in which one styrene unit and one butadiene unit that was polymerized at the 1,2-bond in the main chain were sandwiched by adjacent butadiene units polymerized at the 1,4-bonds is subjected to ozone decomposition, compounds represented by the general formulas (II) and (III) are produced. In the present specification, the compounds represented by the general formulas (II) and (III) are referred to as "ozone-decomposed component S1V1".

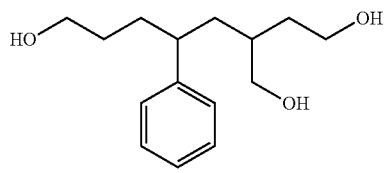

(II)

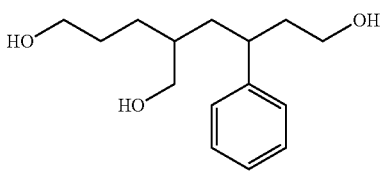

(III)

Furthermore, when a moiety in which one styrene unit and two butadiene units polymerized at the 1,2-bond in the main chain were sandwiched by adjacent butadiene units polymerized at the 1,4-bonds is subjected to ozone decomposition, compounds represented by the general formulas (IV) to (VI) below are produced. In the present specification, the compounds represented by the general formulas (IV) to (VI) are referred to as "ozone-decomposed component S1V2".

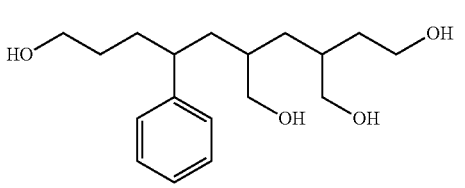

(IV)

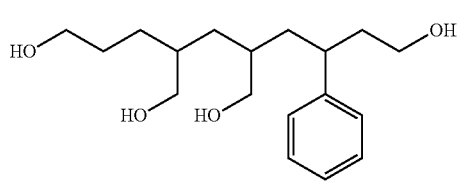

(V)

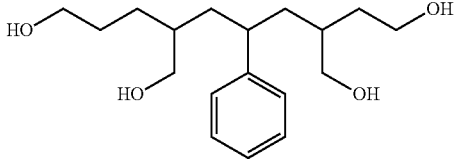

(VI)

As described above, a moiety which is sandwiched by two adjacent butadiene units polymerized at the 1,4-bonds produces a decomposed component in which a styrene-derived unit and/or 1,2-bonded butadiene-derived unit(s) is sandwiched by hydroxyethyl groups at the both terminals by the ozone decomposition. Furthermore, 1,4-butanediol is produced from a moiety in which two or more butadiene units polymerized at the 1,4-bond are continuously repeated.

When the decomposed component obtained by ozone decomposition of the styrene-butadiene copolymer component used in the present technology is measured by gel permeation chromatography (GPC), the total of the styrene content of the ozone-decomposed component S1 and the styrene content of the ozone-decomposed component S1V1 is less than 80 wt. %, preferably from 30 to 70 wt. %, more preferably 40 wt. % or greater but less than 70 wt. %, and even more preferably from 45 to 68 wt. %, of the bonded styrene content. Note that "decomposed component having one styrene-derived unit" refers to the ozone-decomposed component S1 having one styrene-derived unit and the ozone-decomposed component S1V1 having one styrene-derived unit and one 1,2-bonded butadiene-derived unit, as described above. By measuring the ozone-decomposed component by gel permeation chromatography (GPC), the number of moles of the styrene-derived unit in each of the decomposed component can be determined. The weight of the styrene in each of the ozone-decomposed component is calculated based on the number of moles of the styrene-derived unit. The total styrene content of the ozone-decomposed components S1 and S1V1 determined as described above needs to be less than 80 wt. % of the bonded styrene content. By this, even better low heat build-up and modulus of repulsion elasticity can be achieved. Furthermore, wear resistance and tensile strength at break can be maintained or enhanced.

Furthermore, in addition to the description above, when the decomposed component obtained by ozone decomposition of the styrene-butadiene copolymer component used in the present technology is measured by gel permeation chromatography (GPC), the total of the styrene content of the decomposed component S1V1 having one styrene-derived unit and one 1,2-bonded butadiene-derived unit is 10 wt. % or greater, and preferably from 10 to 30 wt. % of the bonded styrene content. The ozone-decomposed component S1V1 is an ozone-decomposed component having one styrene-derived unit and one 1,2-bonded butadiene-derived unit as described above and corresponds to the decomposed component represented by the general formulas (II) and (III) described above. By measuring the ozone-decomposed component by gel permeation chromatography (GPC), the number of moles of the decomposed component represented by the general formulas (II) and (III) is determined, and the weight of the styrene is calculated based on this. The styrene content of the ozone-decomposed component having one styrene-derived unit and one 1,2-bonded butadiene-derived unit needs to be 10 wt. % or greater of the bonded styrene content. By this, even better low heat build-up and modulus of repulsion elasticity can be achieved. Furthermore, wear resistance and tensile strength at break can be ensured.

In the present specification, the method of subjecting the styrene-butadiene copolymer component to ozone decomposition and the measurement of the ozone decomposition are performed by methods described in Tanaka et al., "Polymer, 22, 1721(1981)" and "Macromolecules, 16, 1925 (1983)". Note that, in the analysis method described in Tanaka et al., the total of the general formulas (I), (II), and (III) is referred to as "styrene single chain". On the other hand, the present technology focuses on the total amount of the ozone-decomposed component S1 having one styrene-derived unit and the ozone-decomposed component S1V1 having one styrene-derived unit and one 1,2-bonded butadiene-derived unit (S1+S1V1; total of the decomposed component represented by the general formulas (I), (II), and (III) described above) as well as the decomposed component having one styrene-derived unit and one 1,2-bonded butadiene-derived unit (S1V1; decomposed component represented by the general formulas (II) and (III) described above) as described above, and these are analyzed separately.

In the present specification, the following conditions can be employed for the measurement of the ozone-decomposed component by gel permeation chromatography (GPC).

Measurement instrument: LC-9104 (manufactured by Japan Analytical Industry Co., Ltd.)

Column: Two columns of JAIGEL-1H and two columns of JAIGEL-2H are connected in series for use (both are manufactured by Japan Analytical Industry Co., Ltd.)

Detector: UV DETECTOR 3702 (manufactured by Japan Analytical Industry Co., Ltd.)

Differential refractometer RI DETECTOR RI-7 (manufactured by Japan Analytical Industry Co., Ltd.)

Eluent: Chloroform

Column temperature: Room temperature

In the styrene-butadiene copolymer component used in the present technology, (3) when the decomposed component obtained by ozone decomposition is measured by liquid chromatography-mass spectrometer (LCMS), an integrated intensity of a decomposed component S1V2 having one styrene-derived unit and two 1,2-bonded butadiene-derived units is 15% or greater, and preferably from 15 to 40%, of an integrated intensity of all the decomposed components containing a styrene-derived unit. By setting the integrated intensity of the decomposed component S1V2 to 15% or greater, even better low heat build-up and modulus of repulsion elasticity can be achieved. Note that the decomposed component S1V2 having one styrene-derived unit and two 1,2-bonded butadiene-derived units is an ozone-decomposed component having one styrene-derived unit and two 1,2-bonded butadiene-derived units and corresponds to the decomposed component represented by the general formulas (IV), (V), and (VI) described above. By measuring these by a liquid chromatography-mass spectrometer (LCMS), an integrated intensity of a peak that is intrinsic to each decomposed component having the molecular weight of the general formulas (IV), (V), and (VI) is determined.

The integrated intensity of each of the decomposed component can be determined by using the measurement method and analysis method described below. Since molecules of each decomposed component can be detected in a state of sodium-added ions, each mass chromatogram is extracted based on the mass spectrum. The mass spectrum of the sodium-added ion is 333.21 in the case of the decomposed component S1V2 having one styrene-derived unit and two 1,2-bonded butadiene-derived units. In the mass chromatogram of 333.21, the peak of the decomposed component S1V2 is determined, and an integrated intensity A [S1V2] thereof is determined. Similarly, the integrated intensity of all the decomposed components including the other styrene-derived unit is determined, and the sum A [total] thereof is determined. The proportion (S1V2) of the integrated intensity of the ozone-decomposed product having one styrene-derived unit and two 1,2-bonded butadiene-derived units relative to the sum A [total] of the integrated intensity of all the decomposed components including styrene-derived unit is calculated by a formula:

$$A[S1V2]/A[total] \times 100.$$

In the present specification, the following conditions can be employed for the measurement of the ozone-decomposed component by liquid chromatography-mass spectrometer (LCMS).

Liquid chromatograph: Alliance 2695 (manufactured by Nihon Waters K.K.)

Mass analyzer: ZQ2000 (manufactured by Nihon Waters K.K.)

Column: Hydrosphere C18 (manufactured by YMC Co., Ltd.; inner diameter: 2.0 mm; length: 150 mm; particle size: 3 μm)

Injection amount: 5 μL (approximately 10 mg/mL)

Mobile phase A: Water

Mobile phase B: Methanol

Flow rate: 0.2 mL/min

Time program: B conc. 20% (0 minutes)→100% (35 minutes)→100% (50 minutes)

Ion source temperature: 120° C.

Desolvation temperature: 350° C.

Cone voltage: 40 V

Ionization method: (ESI positive mode)

Mass analysis condition: Scan measurement, mass range m/z from 50 to 2000

In the styrene-butadiene copolymer component used in the present technology, (4) the vinyl content of the butadiene moiety is 50% or greater, and preferably from 50 to 65%. By setting the vinyl content of the butadiene moiety in the styrene-butadiene copolymer component to be 50% or greater, it is possible to maintain and enhance wear resistance of the rubber composition and to achieve the balance between hysteresis loss and wet skid characteristics. That is, by setting the vinyl content of the butadiene moiety to be 50% or greater, rubber strength and wear resistance can be enhanced and increase in hysteresis loss can be suppressed. Note that the vinyl content of the butadiene moiety is measured by $^1$H-NMR.

The content of the styrene-butadiene copolymer component having the characteristics (1) to (4) is preferably 40 wt. % or greater, more preferably from 60 to 100 wt. %, and even more preferably from 80 to 100 wt. %, per 100 wt. % of the diene rubber. By allowing 40 wt. % or greater of the styrene-butadiene copolymer component specified by the characteristics (1) to (4) to be contained, even better low heat build-up and modulus of repulsion elasticity of the rubber composition can be achieved.

The rubber composition of the present technology may contain another diene rubber except the styrene-butadiene copolymer component satisfying all the characteristics (1) to (4). Examples of such another diene rubber include natural rubber (NR), polyisoprene rubber (IR), polybutadiene rubber (low cis-BR), high-cis BR, high-trans BR (from 70 to 95% of the trans-bond content in the butadiene moiety), styrene-isoprene copolymer rubber, butadiene-isoprene copolymer rubber, solution polymerized random styrene-butadiene-isoprene copolymer rubber, emulsion polymerized random styrene-butadiene-isoprene copolymer rubber, emulsion polymerized styrene-acrylonitrile-butadiene copolymer rubber, acrylonitrile-butadiene copolymer rubber, high vinyl SBR-low vinyl SBR block copolymer rubber, polyisoprene-SBR block copolymer rubber, and polystyrene-polybutadiene-polystyrene block copolymer.

The content of such another diene rubber is preferably 60 wt. % or less, more preferably from 0 to 40 wt. %, and even more preferably from 0 to 20 wt. %, per 100 wt. % of the diene rubber. By allowing another diene rubber to be contained, various physical properties such as wear resistance and low impact resilience can be enhanced.

The rubber composition of the present technology contains a diene rubber and a reinforcing filler. Examples of the reinforcing filler include inorganic fillers, such as carbon black, silica, clay, aluminum hydroxide, calcium carbonate, mica, talc, aluminum oxide, titanium oxide, and barium sulfate, and organic fillers such as, cellulose, lecithin, lignin, and dendrimer. Among these, at least one type selected from the group consisting of a carbon black and a silica is preferably blended.

By allowing the rubber composition to contain a carbon black, excellent wear resistance and rubber strength of the rubber composition can be achieved. The compounded amount of the carbon black is not particularly limited but is preferably from 10 to 100 parts by weight, and more preferably from 25 to 80 parts by weight, per 100 parts by weight of the diene rubber.

As the carbon black, carbon blacks such as furnace black, acetylene black, thermal black, channel black, and graphite may be blended. Among these, furnace black is preferred, and specific examples thereof include SAF, ISAF, ISAF-HS, ISAF-LS, IISAF-HS, HAF, HAF-HS, HAF-LS, and FEF. The carbon black may be used alone or a combination of two or more types of these carbon blacks may be used. Furthermore, surface-treated carbon blacks obtained by subjecting these carbon blacks to chemical modification with various acid compounds or the like may be also used.

By allowing the rubber composition to contain a silica, excellent low heat build-up and wet grip performance of the rubber composition can be achieved. The compounded amount of the silica is not particularly limited but is preferably from 10 to 150 parts by weight, and more preferably from 40 to 100 parts by weight, per 100 parts by weight of the diene rubber.

The silica may be any silica that is regularly used in rubber compositions for tire treads. Examples thereof include wet method silica, dry method silica, carbon-silica in which silica is supported on a surface of carbon black (dual phase filler), surface-treated silica which is surface-treated with a silane coupling agent or a compound having reactivity or miscibility in both the silica and rubber, such as polysiloxane. Among these, wet method silica containing hydrous silicic acid as a main component is preferred.

In the present technology, the compounded amount of the reinforcing filler including the silica and/or the carbon black is preferably from 10 to 150 parts by weight, and more preferably from 40 to 100 parts by weight, per 100 parts by weight of the diene rubber. When the compounded amount of the reinforcing filler is less than 10 parts by weight, reinforcing performance cannot be sufficiently obtained, and rubber hardness and tensile strength at break become insufficient. When the compounded amount of the reinforcing filler is greater than 150 parts by weight, heat build-up is increased and tensile elongation at break is decreased. Furthermore, wear resistance and processability are deteriorated.

Blending of a silane coupling agent together with silica is preferred in the rubber composition of the present technology since low heat build-up and wear resistance are further enhanced. By blending a silane coupling agent together with silica, dispersibility of silica is enhanced, thereby further increasing reinforcement action with the diene rubber. The compounded amount of the silane coupling agent is preferably from 2 to 20 wt. %, and more preferably from 5 to 15 wt. %, relative to the compounded amount of silica. When the compounded amount of the silane coupling agent is less than 2 wt. % of the weight of the silica, the effect of enhancing dispersibility of the silica cannot be sufficiently obtained. Furthermore, when the compounded amount of the silane coupling agent is greater than 20 wt. %, the diene rubber component tends to be easily gelled, thereby making it impossible to achieve predetermined effects.

The silane coupling agent is not particularly limited but is preferably a sulfur-containing silane coupling agent. Examples thereof include bis(3-triethoxysilylpropyl)tetrasulfide, bis(3-triethoxysilylpropyl)trisulfide, bis(3-triethoxysilylpropyl)disulfide, bis(2-(triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyldimethoxymethylsilane, 3-mercaptopropyldimethylmethoxysilane, 2-mercaptoethyltriethoxysilane, 3-mercaptopropyltriethoxysilane, mercaptosilane compounds such as those exemplified in JP-A-2006-249069A including VP Si363 manufactured by Evonik, 3-trimethoxysilylpropylbenzothiazoletetrasulfide, 3-triethoxysilylpropylbenzothiazolyltetrasulfide, 3-triethoxysilylpropylmethacrylatemonosulfide, 3-trimethoxysilylpropylmethacrylatemonosulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, bis(3-diethoxymethylsilylpropyl) tetrasulfide, dimethoxymethylsilylpropyl-N,N-dimethylthiocarbamoyltetrasulfide, dimethoxymethylsilylpropylbenzothiazolyltetrasulfide, 3-octanoylthiopropyltriethoxysilane, 3-propionylthiopropyltrimethoxysilane, vinyltrimethoxysilane, vinyltriethoxysilane, vinyltris(2-methoxyethoxy)silane, 3-glycidoxypropyltrimethoxysilane, 3-glycidoxypropylmethyldimethoxysilane, β-(3,4-epoxycyclohexyl)ethyltrimethoxysilane, 3-aminopropyltrimethoxysilane, and N-(β-aminoethyl)-γ-aminopropyltrimethoxysilane, N-(β-aminoethyl)-γ-aminopropylmethyldimethoxysilane. Furthermore, the silane coupling agent is an organosilicon compound, and examples of the organosilicon compound include polysiloxane, silicone oils in which at least one of organic groups, including an amino group, an epoxy group, a carbinol group, a mercapto group, a carboxyl group, a hydrogen group, a polyether group, a phenol group, a silanol group, an acryl group, a methacryl group, or a long-chain alkyl group, is introduced to a side chain, both terminals, one terminal, or both of side chain and both terminals of the polysiloxane, and silicone oligomers obtained by subjecting at least one type of organosilane to condensation reaction. Among these, bis-(3-triethoxysilylpropyl)tetrasulfide and bis(3-triethoxysilylpropyl)disulfide are preferred.

In addition to the components described above, various compounding agents that are commonly used in rubber compositions for tire treads, such as vulcanization or cross-linking agents, vulcanization accelerators, anti-aging agents, processing aids, plasticizers, liquid polymers, thermosetting resins, and thermoplastic resins may be blended in the rubber composition of the present technology in accordance with conventional methods. These compounding agents can be kneaded by a common method to obtain a rubber composition that can then be used for vulcanization or cross-linking. These compounding agents can be compounded in typical amounts conventionally used. The rubber composition for tire treads can be prepared by mixing the components described above using a publicly known rubber kneading machine such as a Banbury mixer, a kneader, and a roller.

Although the vulcanization or cross-linking agent is not particularly limited; examples thereof include sulfurs, such as powder sulfur, precipitated sulfur, colloidal sulfur, insoluble sulfur, and highly dispersible sulfur; halogenated sulfurs, such as sulfur monochloride and sulfur dichloride; and organic peroxides, such as dicumyl peroxide and di-tert-butyl peroxide. Among these, sulfur is preferred, and powder sulfur is particularly preferred. The vulcanization or cross-linking agent may be used alone or a combination of two or more types of these vulcanization and/or cross-linking agents may be used. The compounded proportion of the vulcanizing agent is typically from 0.1 to 15 parts by weight, preferably from 0.3 to 10 parts by weight, and even more preferably from 0.5 to 5 parts by weight, per 100 parts by weight of the diene rubber.

The vulcanization accelerator is not particularly limited, and examples thereof include sulfenamide-based vulcanization accelerators, such as N-cyclohexyl-2-benzothiazyl-sulfenamide, Nt-butyl-2-benzothiazolesulfenamide, N-oxyethylene-2-benzothiazolesulfenamide, N,N'-diisopropyl-2-benzothiazolesulfenamide; guanidine-based vulcanization accelerators, such as diphenylguanidine, di-o-tolylguanidine, and (o-tolyl)biguanidine; thiourea-based vulcanization accelerators, such as diethyl thiourea; thiazole-based vulcanization accelerators, such as 2-mercaptobenzothiazole, dibenzothiazyl disulfide, and zinc 2-mercaptobenzothiazole salt; thiuram-based vulcanization accelerators, such as tetramethylthiuram monosulfide and tetramethylthiuram disulfide; dithiocarbamic acid-based vulcanization accelerators, such as sodium dimethyldithiocarbamate and zinc diethyldithiocarbamate; and xanthogenic acid-based vulcanization accelerators, such as sodium isopropylxanthogenate, zinc isopropylxanthogenate, and zinc butylxanthogenate. Among these, a vulcanization accelerator containing a sulfenamide-based vulcanization accelerator is particularly preferred. The vulcanization accelerator may be used alone or a combination of two or more types of these vulcanization accelerators may be used. The compounded amount of the vulcanization accelerator is preferably from 0.1 to 15 parts by weight, and more preferably from 0.5 to 5 parts by weight, per 100 parts by weight of the diene rubber.

The anti-aging agent is not particularly limited, and examples thereof include amine-based anti-aging agents, such as 2,2,4-trimethyl-1,2-dihydroquinoline polymers, p,p'-dioctyldiphenylamine, N,N'-diphenyl-p-phenylenediamine, and N-phenyl-N'-1,3-dimethylbutyl-p-phenylenediamine; and phenol-based anti-aging agents, such as 2,6-di-t-butyl-4-methylphenol and 2,2'-methylenebis(4-methyl-6-t-butylphenol). The anti-aging agent may be used alone or a combination of two or more types of these anti-aging agents may be used. The compounded amount of the anti-aging agent is preferably from 0.1 to 15 parts by weight, and more preferably from 0.5 to 5 parts by weight, per 100 parts by weight of the diene rubber.

The processing aid is not particularly limited, and for example, higher fatty acids such as stearic acid, higher fatty amides such as stearamide, higher fatty amines such as stearylamine, higher aliphatic alcohols such as stearyl alcohol, partial esters of fatty acid and polyhydric alcohol, such as glycerine fatty acid esters, fatty acid metal salts such as zinc stearate, zinc oxide can be used. Although the compounded amount is appropriately selected, the compounded amount of the higher fatty acid, higher fatty amide, higher alcohol, and/or fatty acid metal salt is preferably from 0.05 to 15 parts by weight, and more preferably from 0.5 to 5 parts by weight, per 100 parts by weight of the diene rubber. The compounded amount of the zinc oxide is preferably from 0.05 to 10 parts by weight, and more preferably from 0.5 to 3 parts by weight, per 100 parts by weight of the diene rubber.

The plasticizer used as a compounding agent is not particularly limited, and for example, aromatic, naphthene-based, paraffin-based, silicone-based, or similar extender oil is selected depending on the application. The used amount of the plasticizer is typically from 1 to 150 parts by weight, preferably from 2 to 100 parts by weight, and even more preferably from 3 to 60 parts by weight, per 100 parts by weight of the diene rubber. When the used amount of the plasticizer is within this range, dispersing effect of the reinforcing agent, tensile strength, wear resistance, heat resistance, and the like are well-balanced at a high level. Examples of other plasticizers include diethylene glycol, polyethylene glycol, and silicone oils.

The thermosetting resin is not particularly limited, and examples thereof include resorcin-formaldehyde resins, phenol-formaldehyde resins, urea-formaldehyde resins, melamine-formaldehyde resins, and phenol derivative-formaldehyde resins. Specific examples thereof include thermosetting resins that are cured or polymerized by heating or by applying heat and a methylene donor, such as m-3,5-xylenol-formaldehyde resins and 5-methylresorcin-formaldehyde resins; other guanamine resins, diallylphthalate resins, vinyl ester resins, phenolic resins, unsaturated polyester resins, furan resins, polyimide resins, polyurethane resins, melamine resins, urea resins, and epoxy resins.

The thermosetting resin is not particularly limited, and examples of general purpose thermoplastic resins include polystyrene-based resins, polyethylene-based resins, polypropylene-based resins, polyester-based resins, polyamide-based resins, polycarbonate-based resins, polyurethane-based resins, polysulfone-based resins, polyphenylene ether-based resins, polyphenylene sulfide-based resins. In addition, examples thereof include aromatic hydrocarbon-based resins, such as styrene-α-methylstyrene resins, indene-isopropenyltoluene resins, and coumarone-indene resins, hydrocarbon resins, such as dicyclopentadiene resins and petroleum resins including 1,3-pentadiene, pentene, methylbutene, or the like as the main ingredient, alkylphenol resins, modified phenolic resins, terpene phenol resins, terpene-based resins, and aromatic modified terpene resins.

Since the rubber composition of the present technology is to enhance low heat build-up and modulus of repulsion elasticity to or beyond conventional levels while wear resistance is ensured, wear resistance and low rolling resistance (fuel economy performance) of a pneumatic tire can be enhanced to or beyond conventional levels.

The rubber composition of the present technology can be suitably used in cap tread portions, undertread portions, sidewall portions, bead filler portions, coating rubbers for cord such as carcass layers, belt layers, and belt cover layers, side reinforcing rubber layers having a crescent shaped cross section used in run flat tires, and rim cushion portions of pneumatic tires. A pneumatic tire which uses the rubber composition of the present technology in these members can maintain and/or enhance low rolling resistance (fuel economy performance) and wear resistance to or beyond conventional levels due to the enhanced low heat build-up, modulus of repulsion elasticity, and wear resistance.

The present technology is further described below by examples. However, the scope of the present technology is not limited to these examples.

EXAMPLES

A styrene-butadiene copolymer component was prepared by blending 11 types of styrene-butadiene copolymers in a compounding ratio shown in Table 1 or 2 and used to measure (1) the bonded styrene content; (2) the total proportion of the styrene contents of the ozone-decomposed component S1 having one styrene-derived unit and the ozone-decomposed component S1V1 having one styrene-derived unit and one 1,2-bonded butadiene-derived unit (S1+S1V1; wt. %) relative to the bonded styrene content, and the total proportion of the styrene content of the ozone-decomposed component S1V1 having one styrene-derived unit and one 1,2-bonded butadiene-derived unit (S1V1; wt. %) relative to the bonded styrene content; (3) the proportion of the integrated intensity of the decomposed component S1V2 having one styrene-derived unit and two 1,2-bonded butadiene-derived units relative to the integrated intensity of all the decomposed products having a styrene-derived unit (S1V2; %); and (4) the vinyl content of butadiene moiety. Furthermore, since NS460, Tufdene 2330, NS522, NS570, HP755B, E581, and Nipol 1739 are oil extended products, net compounded amounts of the rubber components are shown in parentheses in addition to the actual compounded amounts.

(1) The bonded styrene content and (4) the vinyl content of the butadiene moiety of the styrene-butadiene copolymer component were measured by $^{1}$H-NMR.

The ozone decomposition conditions of the styrene-butadiene copolymer component were as described above. Furthermore, (2) the total proportion of the styrene contents of the ozone-decomposed component S1 having one styrene-derived unit and the ozone-decomposed component S1V1 having one styrene-derived unit and one 1,2-bonded butadiene-derived unit (S1+S1V1; wt. %) relative to the bonded styrene content, and the total proportion of the styrene content of the ozone-decomposed component S1V1 having one styrene-derived unit and one 1,2-bonded butadiene-derived unit (S1V1; wt. %) relative to the bonded styrene content were measured by gel permeation chromatography (GPC). The measurement conditions of the gel permeation chromatography (GPC) were as described above. Furthermore, (3) the proportion of the integrated intensity of the decomposed component S1V2 having one styrene-derived unit and two 1,2-bonded butadiene-derived units relative to the integrated intensity of all the decomposed components including styrene-derived unit (S1V2; %) were measured by liquid chromatography-mass spectrometer (LCMS). The measurement conditions of the liquid chromatography-mass spectrometer (LCMS) were as described above.

Seventeen types of the rubber compositions (Examples 1 to 12 and Comparative Examples 1 to 5) formed from the styrene-butadiene copolymer components shown in Tables 1 and 2 (blends of a plurality of styrene-butadiene copolymers) and other diene rubbers using the compounding agents shown in Table 3 as common formulation, except the sulfur and the vulcanization accelerator, were mixed in a 1.7 L sealed Banbury mixer for 6 minutes, discharged from the mixer at 150° C., and cooled at room temperature. Next, the mixture was mixed again for 3 minutes using the 1.7 L sealed Banbury mixer and discharged. Then, the sulfur and the vulcanization accelerators were mixed using an open roll to prepare a rubber composition. The obtained rubber composition was vulcanized in a predetermined mold at 160° C. for 30 minutes to produce a vulcanized rubber test piece. Using the obtained vulcanized rubber test piece, modulus of repulsion elasticity (60° C.), tan δ (60° C.), and wear resistance were evaluated by the following measurement methods. Modulus of repulsion elasticity (60° C.)

The obtained vulcanized rubber test piece was used to measure the impact resilience at a temperature of 60° C. in accordance with JIS K6255. The obtained results are shown as index values in the "Modulus of repulsion elasticity (60° C.)" rows of Tables 1 and 2, with the value of Comparative Example 1 expressed as an index of 100. A larger index value of the modulus of repulsion elasticity (60° C.) indicates a smaller, i.e. even better, rolling resistance when a tire is formed. tan δ (60° C.)

The dynamic visco-elasticity of the obtained vulcanized rubber test piece was measured using a viscoelasticity spectrometer, manufactured by Iwamoto Seisakusho Co., Ltd., under the following conditions: elongation deformation strain: 10±2%; vibration frequency: 20 Hz; temperature: 60° C., thereby determining tan δ (60° C.). The obtained results are shown as index values in the "tan δ (60° C.)" rows of Tables 1 and 2, with the value of Comparative Example 1 expressed as an index of 100. A smaller index value of tan δ (60° C.) indicates lower heat build-up, and smaller rolling resistance when a tire is formed.

Wear Resistance

The amount of wear of the obtained vulcanized rubber test piece was measured in accordance with JIS K6264, using a Lambourn abrasion test machine (manufactured by Iwamoto Seisakusho Co., Ltd.) under the following conditions: a load of 15.0 kg (147.1 N) and slip ratio of 25%. From the obtained results, reciprocal values were calculated, and the calculated values are shown as index values in the "Wear resistance" rows of Tables 1 and 2, with the reciprocal of the amount of wear of Comparative Example 1 expressed as an index of 100. A larger index value of the wear resistance indicates superior wear resistance.

TABLE 1-1

|  |  | Comparative Example 1 | Comparative Example 2 | Comparative Example 3 | Comparative Example 4 |
|---|---|---|---|---|---|
| NS116 | Part by weight |  |  | 30 |  |
| NS616 | Part by weight | 80 |  |  |  |
| NS460 | Part by weight | 27.5 (20) |  |  |  |
| HPR850 | Part by weight |  |  |  |  |
| Y031 | Part by weight |  | 50 |  |  |
| Tufdene 2330 | Part by weight |  | 68.75 (50) |  |  |
| NS522 | Part by weight |  |  |  | 137.5 (100) |
| NS570 | Part by weight |  |  | 96.25 (70) |  |
| E581 | Part by weight |  |  |  |  |

TABLE 1-1-continued

| | | | | | |
|---|---|---|---|---|---|
| Nipol 1739 | Part by weight | | | | |
| Oil | Part by weight | 30 | 18.75 | 11.25 | 0 |
| Bonded styrene content | wt. % | 21.7 | 26.4 | 34.7 | 39.2 |
| Vinyl content | % | 63.2 | 43.0 | 41.5 | 42.2 |
| S1 + S1V1 | wt. % | 62.4 | 59.6 | 67.2 | 59.2 |
| S1V1 | wt. % | 17.7 | 9.1 | 13.2 | 9.0 |
| S1V2 (integrated intensity ratio) | % | 14.8 | 17.2 | 28.4 | 16.0 |
| Wear resistance | Index value | 100 | 98 | 91 | 92 |
| tan δ (60° C.) | Index value | 100 | 95 | 103 | 96 |
| Modulus of repulsion elasticity (60° C.) | Index value | 100 | 103 | 102 | 102 |

| | | Comparative Example 5 | Example 1 | Example 2 | Example 3 | Example 4 |
|---|---|---|---|---|---|---|
| NS116 | Part by weight | 30 | 50 | | | |
| NS616 | Part by weight | | | 40 | 70 | 70 |
| NS460 | Part by weight | | | | | |
| HPR850 | Part by weight | | | | | |
| Y031 | Part by weight | | | | | |
| Tufdene 2330 | Part by weight | | | | | 41.25 (30) |
| NS522 | Part by weight | | | 82.5 (60) | | |
| NS570 | Part by weight | | | | 41.25 (30) | |
| E581 | Part by weight | | 68.75 (50) | | | |
| Nipol 1739 | Part by weight | 96.25 (70) | | | | |
| Oil | Part by weight | 11.25 | 18.75 | 15 | 26.25 | 26.25 |
| Bonded styrene content | wt. % | 34.1 | 28.6 | 31.9 | 26.8 | 22.4 |
| Vinyl content | % | 32.0 | 53.1 | 50.7 | 53.9 | 52.8 |
| S1 + S1V1 | wt. % | 51.1 | 49.6 | 62.0 | 66.7 | 65.3 |
| S1V1 | wt. % | 8.8 | 16.8 | 13.0 | 15.8 | 17.1 |
| S1V2 (integrated intensity ratio) | % | 17.1 | 25.1 | 15.2 | 18.5 | 16.4 |
| Wear resistance | Index value | 89 | 100 | 99 | 102 | 105 |
| tan δ (60° C.) | Index value | 114 | 97 | 89 | 90 | 93 |
| Modulus of repulsion elasticity (60° C.) | Index value | 96 | 103 | 103 | 102 | 102 |

TABLE 2-1

| | | Example 5 | Example 6 | Example 7 | Example 8 |
|---|---|---|---|---|---|
| NS460 | Part by weight | 68.75 (50) | | | |
| HPR850 | Part by weight | | 90 | 80 | 72 |
| Tufdene 2330 | Part by weight | | | 27.5 (20) | 11 (8) |
| NS522 | Part by weight | | | | |
| HP755B | Part by weight | 68.75 (50) | | | |
| E581 | Part by weight | | | | |
| Nipol 1739 | Part by weight | | | | 13.75 (10) |
| NR | Part by weight | | | | 20 |
| BR | Part by weight | | | | |
| Oil | Part by weight | 0 | 33.75 | 30 | 34.5 |
| Bonded styrene content | wt. % | 32.3 | 28.2 | 26.7 | 26.8 |
| Vinyl content | % | 51.1 | 54.8 | 52.7 | 55.8 |
| S1 + S1V1 | wt. % | 59.7 | 62.1 | 63.8 | 63.9 |
| S1V1 | wt. % | 12.2 | 18.4 | 18.7 | 19.5 |
| S1V2 (integrated intensity ratio) | % | 19.3 | 22.4 | 23.2 | 23.4 |

TABLE 2-1-continued

| | | | | | |
|---|---|---|---|---|---|
| Wear resistance | Index value | 100 | 104 | 104 | 105 |
| tan δ (60° C.) | Index value | 82 | 78 | 78 | 76 |
| Modulus of repulsion elasticity (60° C.) | Index value | 102 | 112 | 113 | 113 |

| | | Example 9 | Example 10 | Example 11 | Example 12 |
|---|---|---|---|---|---|
| NS460 | Part by weight | | | | |
| HPR850 | Part by weight | 81 | 70 | 70 | 80 |
| Tufdene 2330 | Part by weight | | | | |
| NS522 | Part by weight | | 41.25 (30) | | |
| HP755B | Part by weight | 12.38 (9) | | 41.25 (30) | |
| E581 | Part by weight | | | | 13.75 (10) |
| Nipol 1739 | Part by weight | | | | |
| NR | Part by weight | | | | |
| BR | Part by weight | 10 | | | 10 |
| Oil | Part by weight | 34.12 | 26.25 | 26.25 | 33.75 |
| Bonded styrene content | wt. % | 28.2 | 30.6 | 30.7 | 27.9 |
| Vinyl content | % | 56.9 | 53.8 | 53.0 | 57.1 |
| S1 + S1V1 | wt. % | 64.8 | 62.5 | 66.4 | 61.0 |
| S1V1 | wt. % | 19.4 | 16.8 | 17.7 | 19.1 |
| S1V2 (integrated intensity ratio) | % | 23.3 | 21.3 | 22.7 | 23.4 |
| Wear resistance | Index value | 104 | 103 | 102 | 105 |
| tan δ (60° C.) | Index value | 77 | 81 | 83 | 76 |
| Modulus of repulsion elasticity (60° C.) | Index value | 113 | 111 | 110 | 113 |

The types of raw materials used in Tables 1 and 2 are shown below.

NS116: NS116, manufactured by Zeon Corporation; bonded styrene content: 20.9 wt. %; vinyl content: 63.8%; non-oil extended product NS616: NS616, manufactured by Zeon Corporation; bonded styrene content: 20.9 wt. %; vinyl content: 63.3%; non-oil extended product NS460: NS460, manufactured by Zeon Corporation; bonded styrene content: 25.1 wt. %; vinyl content: 62.8%; oil extended product in which 37.5 parts by weight of oil component was added to 100 parts by weight of SBR HPR850: HPR850, manufactured by JSR Corporation; bonded styrene content: 27.0 wt. %; vinyl content: 58.8%; non-oil extended product Y031: Y031, manufactured by Asahi Kasei Chemicals Corporation; bonded styrene content: 27.1 wt. %; vinyl content: 57.5%; non-oil extended product Tufdene 2330: Tufdene 2330, manufactured by Asahi Kasei Chemicals Corporation; bonded styrene content: 25.8 wt. %; vinyl content: 28.5%; non-oil extended product NS522: NS522, manufactured by Zeon Corporation; bonded styrene content: 39.2 wt. %; vinyl content: 42.2%; oil extended product in which 37.5 parts by weight of oil component was added to 100 parts by weight of SBR NS570: NS570, manufactured by Zeon Corporation; bonded styrene content: 40.6 wt. %; vinyl content: 19.0%; oil extended product in which 37.5 parts by weight of oil component was added to 100 parts by weight of SBR HP755B: HP755B, manufactured by JSR Corporation; bonded styrene content: 39.6 wt. %; vinyl content: 39.4%; oil extended product in which 37.5 parts by weight of oil component was added to 100 parts by weight of SBR E581: E581, manufactured by Asahi Kasei Chemicals Corporation; bonded styrene content: 35.6 wt. %; vinyl content: 41.3%; oil extended product in which 37.5 parts by weight of oil component was added to 100 parts by weight of SBR Nipol 1739: manufactured by Zeon Corporation; bonded styrene content: 39.8 wt. %; vinyl content: 18.4%; oil extended product in which 37.5 parts by weight of oil component was added to 100 parts by weight of SBR NR: Natural rubber, TSR20

BR: Polybutadiene; Nipol BR1220, manufactured by Zeon Corporation

Oil: Extract No. 4S, manufactured by Showa Shell Sekiyu K.K.

TABLE 3

| Common formulation of rubber composition | |
|---|---|
| Silica | 70.0 Part by weight |
| Silane coupling agent | 5.6 Part by weight |
| Carbon black | 5.0 Part by weight |
| Zinc oxide | 3.0 Part by weight |
| Stearic acid | 2.0 Part by weight |
| Anti-aging agent | 1.5 Part by weight |
| Wax | 1.0 Part by weight |
| Sulfur | 1.5 Part by weight |
| Vulcanization accelerator-1 | 1.7 Part by weight |
| Vulcanization accelerator-2 | 2.0 Part by weight |

The types of raw materials used as per Table 3 are described below.

Silica: Nipsil AQ, manufactured by Nippon Silica Co., Ltd.

Silane coupling agent: Sulfide-based silane coupling agent; Si69VP, manufactured by Degussa Carbon black: Shoblack N339M, manufactured by Showa Cabot K.K.

Zinc oxide: Zinc Oxide #3, manufactured by Seido Chemical Industry Co., Ltd.

Stearic acid: Stearic acid, manufactured by NOF Corporation

Anti-aging agent: Santoflex 6PPD, manufactured by Solutia Europe

Wax: Paraffin wax, manufactured by Ouchi Shinko Chemical Industrial Co., Ltd.

Sulfur: Oil-treated sulfur, manufactured by Karuizawa Refinery Ltd.

Vulcanization accelerator-1: Sanceller CM-PO (CZ), manufactured by Sanshin Chemical Industry Co., Ltd.

Vulcanization accelerator-2: Sanceller D-G (DPG), manufactured by Sanshin Chemical Industry Co., Ltd.

As is clear from Tables 1 and 2, it was confirmed that the rubber compositions of Examples 1 to 12 enhanced the low heat build-up and the wear resistance. Furthermore, it was confirmed that modulus of repulsion elasticity was maintained or enhanced.

The rubber composition of Comparative Example 2 deteriorated in the wear resistance since the vinyl content of the styrene-butadiene copolymer component was less than 50%, and the proportion (S1V1) of the total styrene content of the ozone-decomposed product having one styrene-derived unit and one 1,2-bonded butadiene-derived unit relative to the bonded styrene content was less than 10 wt. %.

With the rubber composition of Comparative Example 3, the wear resistance was deteriorated and the heat build-up (tan δ at 60° C.) was increased since the styrene-butadiene copolymer component had a vinyl content of less than 50%.

The rubber composition of Comparative Example 4 deteriorated in the wear resistance since the vinyl content of the styrene-butadiene copolymer component was less than 50%, and the proportion (S1V1) of the total styrene content of the ozone-decomposed product having one styrene-derived unit and one 1,2-bonded butadiene-derived unit relative to the bonded styrene content was less than 10 wt. %.

The rubber composition of Comparative Example 5 deteriorated in the wear resistance, the low heat build-up (tan δ at 60° C.), and the modulus of repulsion elasticity (60° C.) since the vinyl content of the styrene-butadiene copolymer component was less than 50%, and the proportion (S1V1) of the total styrene content of the ozone-decomposed product having one styrene-derived unit and one 1,2-bonded butadiene-derived unit relative to the bonded styrene content was less than 10 wt. %.

The invention claimed is:

1. A rubber composition comprising:
   a diene rubber containing at least one styrene-butadiene copolymer and a reinforcing filler; and
   the at least one styrene-butadiene copolymer forming a styrene-butadiene copolymer component having all of characteristics (1) to (4):

(1) a bonded styrene content being from 5 to 50 wt.%;

(2) when a decomposed component S1 having one styrene-derived unit and a decomposed component S1V1 having one styrene-derived unit and one 1,2-bonded butadiene-derived unit are measured by subjecting a decomposed component obtained by ozone decomposition to gel permeation chromatography (GPC), a total of styrene contents of the decomposed component S1 and the decomposed component S1V1 being less than 80 wt.% of the bonded styrene content, and a total of a styrene content of the decomposed component S1V1 being 10 wt.% or greater of the bonded styrene content;

(3) when the decomposed component obtained by ozone decomposition is measured by liquid chromatography-mass spectrometer (LCMS), an integrated intensity of a decomposed component S1V2 having one styrene-derived unit and two 1,2-bonded butadiene-derived units being 15% or greater of an integrated intensity of all the decomposed components containing a styrene-derived unit; and (4) a vinyl content of butadiene moiety being 50% or greater.

2. The rubber composition according to claim 1, wherein the diene rubber further comprises at least one selected from the group consisting of natural rubber, polyisoprene, and polybutadiene.

3. The rubber composition according to claim 1, wherein the reinforcing filler is formed from at least one selected from the group consisting of a silica and a carbon black.

4. A pneumatic tire comprising the rubber composition described in claim 1.

5. The pneumatic tire according to claim 4, wherein the rubber composition is used in a cap tread.

* * * * *